(12) United States Patent
Paris

(10) Patent No.: US 12,126,633 B2
(45) Date of Patent: Oct. 22, 2024

(54) ADMINISTRATION OF ELECTRONIC MAIL UNSUBSCRIBE LINKS

(71) Applicant: Sophos Limited, Abingdon (GB)

(72) Inventor: Sascha Michael Paris, Canton of Aargau (CH)

(73) Assignee: Sophos Limited (GB)

( * ) Notice: Subject to any disclaimer, the term of this patent is extended or adjusted under 35 U.S.C. 154(b) by 169 days.

(21) Appl. No.: 17/708,134

(22) Filed: Mar. 30, 2022

(65) Prior Publication Data

US 2023/0319064 A1    Oct. 5, 2023

(51) Int. Cl.
| | |
|---|---|
| G06F 21/00 | (2013.01) |
| G06F 16/955 | (2019.01) |
| H04L 9/40 | (2022.01) |
| H04L 51/18 | (2022.01) |

(52) U.S. Cl.
CPC ...... H04L 63/1416 (2013.01); G06F 16/9566 (2019.01); H04L 51/18 (2013.01); H04L 63/1441 (2013.01)

(58) Field of Classification Search
None
See application file for complete search history.

(56) References Cited

U.S. PATENT DOCUMENTS

| | | | | |
|---|---|---|---|---|
| 9,521,100 | B2 * | 12/2016 | Kumar | H04L 51/06 |
| 10,938,931 | B1 * | 3/2021 | Ahmann | H04L 51/214 |
| 2002/0087641 | A1 | 7/2002 | Levosky | |
| 2003/0050986 | A1 * | 3/2003 | Matthews | G06Q 10/109 |
| | | | | 715/963 |
| 2005/0041789 | A1 | 2/2005 | Warren-Smith et al. | |
| 2011/0067102 | A1 | 3/2011 | Fukasawa et al. | |
| 2011/0208822 | A1 * | 8/2011 | Rathod | G06Q 30/02 |
| | | | | 709/206 |
| 2013/0218957 | A1 * | 8/2013 | Jeske | H04L 69/329 |
| | | | | 709/203 |
| 2015/0081825 | A1 * | 3/2015 | Patel | H04L 51/02 |
| | | | | 709/206 |
| 2015/0256499 | A1 | 9/2015 | Kumar et al. | |

* cited by examiner

Primary Examiner — Maung T Lwin
(74) Attorney, Agent, or Firm — Schmeiser, Olsen & Watts LLP; Timothy P. Collins, Esq.

(57) ABSTRACT

A method for processing electronic messages including unsubscribe links comprises receiving a plurality of electronic messages directed from a sender to an intended recipient, wherein at least one electronic message from the plurality of electronic messages includes an unsubscribe link that is associated with an instruction that instructs the sender to discontinue sending electronic messages to the intended recipient, parsing the electronic messages to identify unsubscribe links from the plurality of electronic messages, for each identified unsubscribe link, creating a record associated with the identified unsubscribe link in a database, generating an aggregate of the identified unsubscribe links based on the records in the database, and transmitting the aggregate of the identified unsubscribe links to the intended recipient.

18 Claims, 9 Drawing Sheets

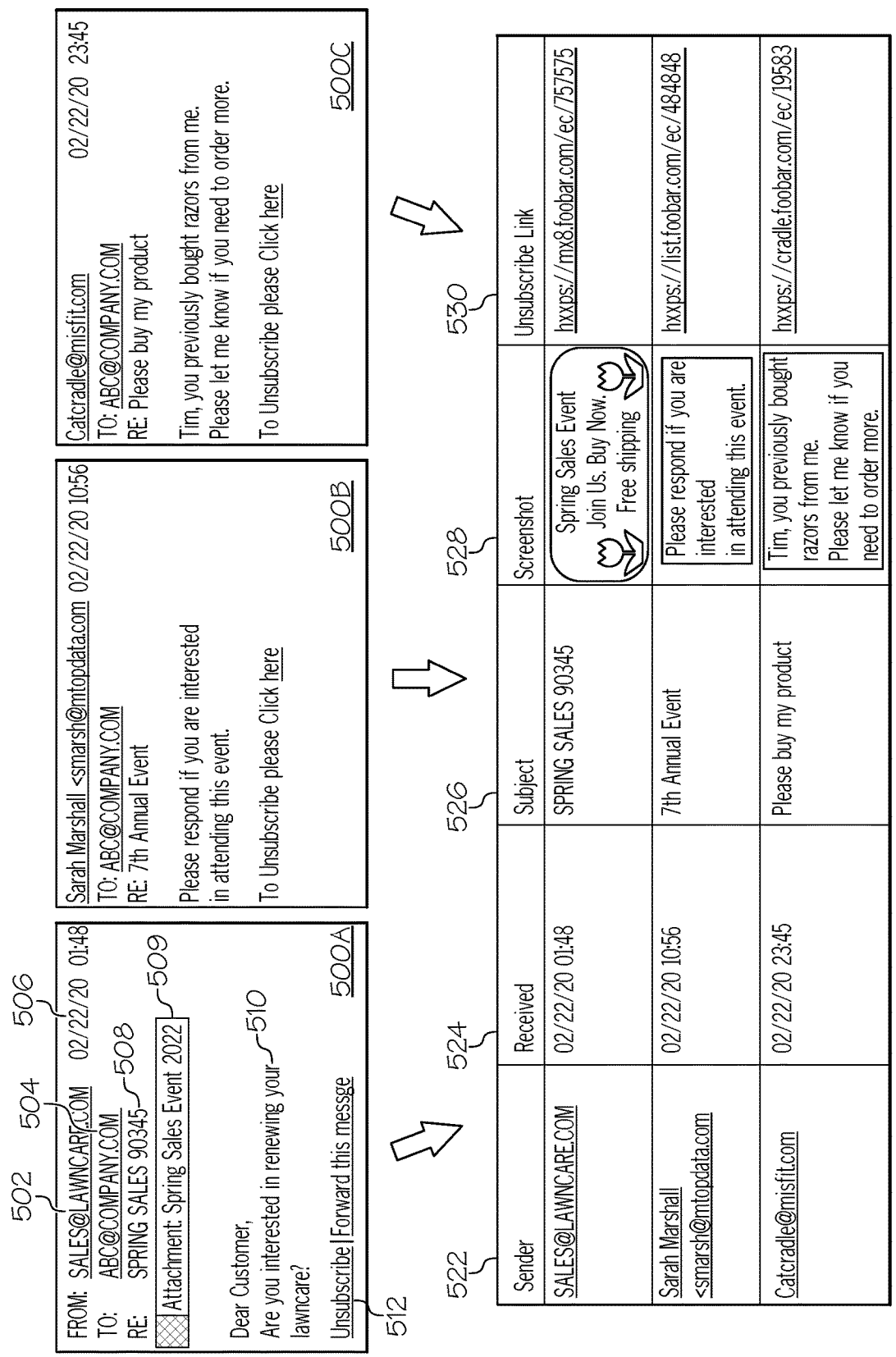

| Sender | Received | Subject | Screenshot | Unsubscribe Link | Safety Check Link | Safety Check Sender | 636 |
|---|---|---|---|---|---|---|---|
| | | | | | | | ... |
| Sarah Marshall<smarsh@mtopdata.com> | 18/01/2022 15:00 | Sascha, IF YOU MARKET: Humor in Copywriting | | http://link | Safe | Safe | Trusted |
| emma.watson@technology-signals.net | 18/01/2022 11:35 | Look into this! | | http://link | Safe | Safe | Trusted |
| Catalina Cernemeco <catalina.cernemeco@sparity-production.com> | 16/01/2022 23:48 | Friendly Reminder: Global Process Improvement & Operational Excellence Summit and Awards | | http://link | Malicious | Malicious | Untrusted |

Dear Sascha

The following unsubscribe links have been collected from mails you received since last digest. You might review the unsubscribeable e-mails and can - if required - directly unsubscribe from specific Newsletters using the provided unsubscribe link. The unsubscribe link only will be provided, if it has been found by Sophos.

| Sender | Received | Subject | Screenshot | Unsubscribe Link | Safety Check | Reputation Check |
|---|---|---|---|---|---|---|
| Sarah Marshall<smarsh@mtopdata.com> | 18/01/2022 15:00 | Sascha, IF YOU MARKET: Humor in Copywriting | | Unsubscribe | Safe | Trusted |
| emma.watson@technology-signals.net | 18/01/2022 11:35 | Look into this!! | | Unsubscribe | Safe | Trusted |
| Catalina Cernemeco <catalina.cernemeco@sparity-production.com> | 16/01/2022 23:48 | Friendly Reminder: Global Process Improvement & Operational Excellence Summit and Awards | | | Malicious | Untrusted |

FIG. 7 http://website

User Unsubscribe Web Portal

Dear User, Here you find the collected unsubscribe Links from your recieved e-mails. You will find the direct unsubscribe links provided, if they are found safe from Sophos.

| Sender | Received | Subject | Screenshot | Unsubscribe Link | Safety Check | Reputation Check |
|---|---|---|---|---|---|---|
| Sarah Marshall<smarsh@mtopdata.com> | 18/01/2022 15:00 | Sascha, IF YOU MARKET: Humor in Copywriting | | Unsubscribe | Safe | Trusted |
| emma.watson@technology-signals.net | 18/01/2022 11:35 | Look into this!! | | Unsubscribe | Safe | Trusted |
| Catalina Cernemeco <catalina.cernemeco@sparity-production.com> | 16/01/2022 23:48 | Friendly Reminder: Global Process Improvement & Operational Excellence Summit and Awards | | | Malicious | Untrusted |

ADMINISTRATION OF ELECTRONIC MAIL UNSUBSCRIBE LINKS

FIELD

The present disclosure relates generally to the special-purpose processing of incoming electronic mail. More specifically, this application describes systems and methods for the collection and personalized administration of unsubscribe links received from incoming electronic mail.

BACKGROUND

Electronic mail, generally referred to as email, is a well-known form of communication between users of personal computers, smart devices, and other electronic devices. The convenience of email has given rise to the proliferation of online marketing efforts that includes unwanted advertising or solicitation messages, colloquially known as "spam," to email users. Email users may be targeted because they may have previously authorized, either intentionally or unintentionally, the email marketer to send advertisements, promotions, solicitations, and the like. In other cases, the sending party may have acquired the email addresses without the users' knowledge.

Regardless of the manner in which an email marketer acquires email addresses, many countries have enacted and enforced laws that require email marketers to offer subscribers an opportunity to opt out of commercial email campaigns. One tactic is for an email marketer to include a uniform resource indicator (URI) within the body of a marketing email, but to present it in the email so that it is obscure or otherwise difficult for the user to see and select the unsubscribe link.

Also, email users may have difficulty authenticating an unsubscribe link sent in an email from an unscrupulous party, which may include a URI that jeopardizes the email user's computer security by exposing the user's computer and network to phishing, ransomware, malware, or other security breach.

Embodiments were therefore conceived in light of the above-mentioned needs, challenges and/or limitations, among other things.

SUMMARY

According to embodiments disclosed herein, a method, and associated computer system and computer program product for the collection and personalized administration of unsubscribe links received from incoming electronic mail is provided. A computer system of a communication network receives a plurality of electronic messages directed from a sender to an intended recipient. At least one electronic message from the plurality of electronic messages includes an unsubscribe link that is associated with an instruction that instructs the sender to discontinue sending electronic messages to the intended recipient. One or more processors of the computer system parses the electronic messages to identify unsubscribe links from the plurality of electronic messages. For each identified unsubscribe link, the one or more processors of the computer system creates a record associated with the identified unsubscribe link in a database. The one or more processors of the computer system generates an aggregate of the identified unsubscribe links based on the records in the database. The aggregate of the identified unsubscribe links is transmitted to the intended recipient.

BRIEF DESCRIPTION OF THE DRAWINGS

The above and further advantages of the disclosed concepts and features may be better understood by referring to the following description in conjunction with the accompanying drawings, in which like reference numerals indicate like elements and features in the various figures. For clarity, not every element may be labeled in every figure. The drawings are not necessarily to scale, emphasis instead being placed upon illustrating the principles of the disclosed concepts and features.

FIG. 5 is an illustrative example of email messages processed to generate a table displaying an aggregate of unsubscribe links and corresponding metadata of the email messages, in accordance with an example embodiment.

FIG. 6 is an illustrative example of a table displaying an aggregate of unsubscribe links, corresponding metadata, and security check information, in accordance with an example embodiment.

FIG. 7 is an illustrative example of a screenshot of an email digest, in accordance with an example embodiment.

FIG. 8 is an illustrative example of a screenshot of a user unsubscribe web portal, in accordance with an example embodiment.

DETAILED DESCRIPTION

Figure 1:
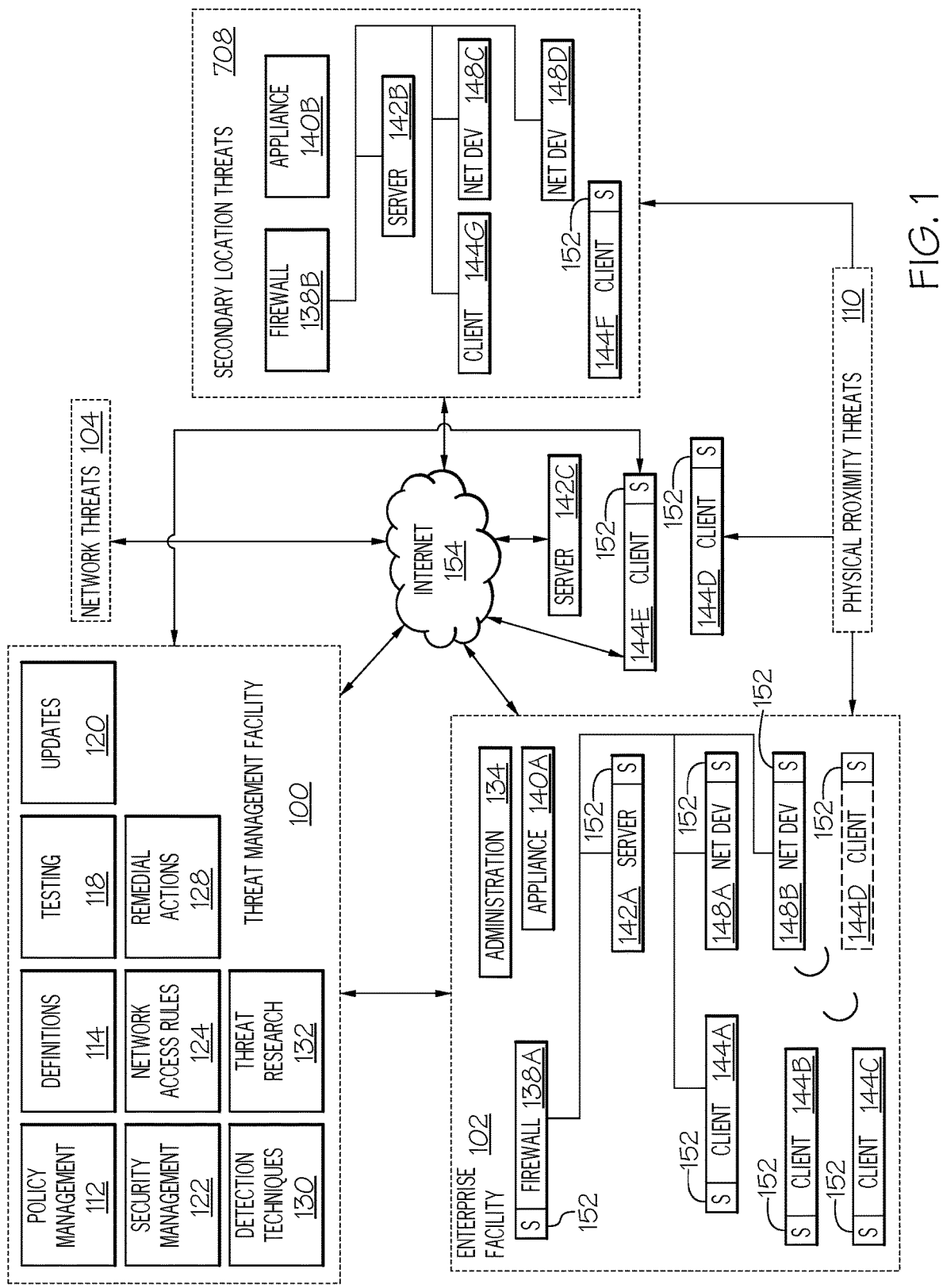
FIG. 1 is a block diagram of a threat management system in which embodiments can be practiced.

Reference in the specification to "one embodiment" or "an embodiment" means that a particular, feature, structure or characteristic described in connection with the embodiment is included in at least one embodiment of the disclosed concepts and features. References to a particular embodiment within the specification do not necessarily all refer to the same embodiment.

The disclosed concepts and features will now be described in more detail with reference to exemplary embodiments thereof as shown in the accompanying drawings. While the disclosed concepts and features are described in conjunction with various embodiments and examples, it is not intended that the disclosed concepts and features be limited to such embodiments. On the contrary, the disclosed concepts and features encompass various alternatives, modifications and equivalents, as will be appreciated by those of skill in the art. Those of ordinary skill having access to the teaching herein will recognize additional implementations, modifications and embodiments, as well as other fields of use, which are within the scope of the present disclosure as described herein.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately" or the like, when accompanying a numerical value, are to be construed as indicating a deviation as would be appreciated by one of ordinary skill in the art to operate satisfactorily for an intended purpose. Similarly, words of approximation such as "approximately" or "substantially" when used in reference to physical characteristics, should be understood to contemplate a range of deviations that would be appreciated by one of ordinary skill in the art to operate satisfactorily for a corresponding use, function, purpose, or the like. Ranges of values and/or numeric values are provided herein as examples only, and do not constitute a limitation on the scope of the described embodiments. Where ranges of values are provided, they are also intended to include each value within the range as if set forth individually, unless expressly stated to the contrary. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "up," "down," and the like, are words of convenience and are not to be construed as limiting terms.

It should also be understood that endpoints, devices, compute instances or the like that are referred to as "within" an enterprise network may also be "associated with" the enterprise network, e.g., where such assets are outside an enterprise gateway but nonetheless managed by or in communication with a threat management facility or other centralized security platform for the enterprise network. Thus, any description referring to an asset within the enterprise network should be understood to contemplate a similar asset associated with the enterprise network regardless of location in a network environment unless a different meaning is explicitly provided or otherwise clear from the context.

Embodiments herein are directed to collecting and processing of unsubscribe links acquired from email messages sent to an intended computer user, and the personalized administering of the unsubscribe links with relevant metadata associated with the messages in a predetermined display format for the intended computer user. An unsubscribe link is generally associated with an instruction that instructs the sender to discontinue sending electronic messages to the intended recipient. In particular, a computing device of the email processing system, for example, shown and described in FIG. 4, can perform an operation to collect unsubscribe links within received emails, acquire metadata from the email contents and/or related information sources, and present a combination of the unsubscribe links and metadata as a consolidated, edited, and personalized overview to a mail recipient.

FIG. 1 is a block diagram of a threat management system providing protection to an enterprise against a plurality of threats. One aspect relates to corporate policy management and implementation through a unified threat management facility 100. As will be explained in more detail below, a threat management facility 100 may be used to protect computer assets from many threats, both computer-generated threats and user-generated threats. The threat management facility 100 may be multi-dimensional in that it may be designed to protect corporate assets from a variety of threats and it may be adapted to learn about threats in one dimension (e.g. worm detection) and apply the knowledge in another dimension (e.g. spam detection). Policy management is one of the dimensions for which the threat management facility can provide a control capability. A corporation or other entity may institute a policy that prevents certain people (e.g., employees, groups of employees, types of employees, guest of the corporation, etc.) from accessing certain types of computer programs. For example, the corporation may elect to prevent its accounting department from using a particular version of an instant messaging service or all such services. In this example, the policy management facility 112 may be used to update the policies of all corporate computing assets with a proper policy control facility or it may update a select few. By using the threat management facility 100 to facilitate the setting, updating and control of such policies the corporation only needs to be concerned with keeping the threat management facility 100 up to date on such policies. The threat management facility 100 can take care of updating all of the other corporate computing assets.

It should be understood that the threat management facility 100 may provide multiple services, and policy management may be offered as one of the services. We will now turn to a description of certain capabilities and components of the threat management system 100.

Over recent years, malware has become a major problem across the Internet 154. From both a technical perspective and a user perspective, the categorization of a specific threat type, whether as virus, worm, spam, phishing exploration, spyware, adware, or the like, is becoming reduced in significance. The threat, no matter how it is categorized, may need to be stopped at various points of a networked computing environment, such as one of an enterprise facility 102, including at one or more laptops, desktops, servers, gateways, communication ports, handheld or mobile devices, firewalls, and the like. Similarly, there may be less and less benefit to the user in having different solutions for known and unknown threats. As such, a consolidated threat management facility 100 may need to apply a similar set of technologies and capabilities for all threats. In certain embodiments, the threat management facility 100 may provide a single agent on the desktop, and a single scan of any suspect file. This approach may eliminate the inevitable overlaps and gaps in protection caused by treating viruses and spyware as separate problems, while simultaneously simplifying administration and minimizing desktop load. As the number and range of types of threats has increased, so may have the level of connectivity available to all IT users. This may have led to a rapid increase in the speed at which threats may move. Today, an unprotected PC connected to the Internet 154 may be infected quickly (perhaps within 10 minutes) which may require acceleration for the delivery of threat protection. Where once monthly updates may have been sufficient, the threat management facility 100 may automatically and seamlessly update its product set against spam and virus threats quickly, for instance, every five minutes, every minute, continuously, or the like. Analysis and testing may be increasingly automated, and also may be performed more frequently; for instance, it may be completed in 15 minutes, and may do so without compromising quality. The threat management facility 100 may also extend techniques that may have been developed for virus and malware protection and provide them to enterprise facility 102 network administrators to better control their environments. In addition to stopping malicious code, the threat management facility 100 may provide policy management that may be able to control legitimate applications, such as voice over Internet Protocol (VoIP), instant messaging, peer-to-peer file-sharing, and the like, that may undermine productivity and network performance within the enterprise facility 102.

The threat management facility 100 may provide an enterprise facility 102 protection from computer-based malware, including viruses, spyware, adware, Trojans, intrusion, spam, policy abuse, uncontrolled access, and the like, where the enterprise facility 102 may be any entity with a networked computer-based infrastructure. In an embodiment, FIG. 1 may depict a block diagram of the threat management facility 100 providing protection to an enterprise against a plurality of threats. The enterprise facility 102 may be corporate, commercial, educational, governmental, or the like, and the enterprise facility's 102 computer network may be distributed amongst a plurality of facilities, and in a plurality of geographical locations, and may include administration 134, a firewall 138A, an appliance 140A, server 142A, network devices 148A-B, clients 144A-D, such as protected by computer security facilities 152, and the like. It will be understood that any reference herein to client facilities may include the clients 144A-D shown in FIG. 1 and vice-versa. The threat management facility 100 may include a plurality of functions, such as security management facility 122, policy management facility 112, update facility 120, definitions facility 114, network access rules facility 124, remedial action facility 128, detection techniques facility 130, testing facility 118, threat research facility 132, and the like. In embodiments, the threat protection provided by the threat management facility 100 may extend beyond the network boundaries of the enterprise facility 102 to include clients 144D (or client facilities) that have moved into network connectivity not directly associated or controlled by the enterprise facility 102. Threats to client facilities may come from a plurality of sources, such as from network threats 104, physical proximity threats 110, secondary location threats 108, and the like. Clients 144A-D may be protected from threats even when the client 144A-D is not located in association with the enterprise 102, such as when a client 144E-F moves in and out of the enterprise facility 102, for example when interfacing with an unprotected server 142C through the Internet 154, when a client 144F is moving into a secondary location threat 108 such as interfacing with components 140B, 142B, 148C, 148D that are not protected, and the like. In embodiments, the threat management facility 100 may provide an enterprise facility 102 protection from a plurality of threats to multiplatform computer resources in a plurality of locations and network configurations, with an integrated system approach.

In embodiments, the threat management facility 100 may be provided as a stand-alone solution. In other embodiments, the threat management facility 100 may be integrated into a third-party product. An application programming interface (e.g. a source code interface) may be provided such that the threat management facility 100 may be integrated. For instance, the threat management facility 100 may be stand-alone in that it provides direct threat protection to an enterprise or computer resource, where protection is subscribed to directly 100. Alternatively, the threat management facility 100 may offer protection indirectly, through a third-party product, where an enterprise may subscribe to services through the third-party product, and threat protection to the enterprise may be provided by the threat management facility 100 through the third-party product.

The security management facility 122 may include a plurality of elements that provide protection from malware to enterprise facility 102 computer resources, including endpoint security and control, email security and control, web security and control, reputation-based filtering, control of unauthorized users, control of guest and non-compliant computers, and the like. The security management facility 122 may be a software application that may provide malicious code and malicious application protection to a client facility computing resource. The security management facility 122 may have the ability to scan the client facility files for malicious code, remove or quarantine certain applications and files, prevent certain actions, perform remedial actions and perform other security measures. In embodiments, scanning the client facility may include scanning some or all of the files stored to the client facility on a periodic basis, scanning an application when the application is executed, scanning files as the files are transmitted to or from the client facility, or the like. The scanning of the applications and files may be performed to detect known malicious code or known unwanted applications. In an embodiment, new malicious code and unwanted applications may be continually developed and distributed, and updates to the known code database may be provided on a periodic basis, on a demand basis, on an alert basis, or the like.

In an embodiment, the security management facility 122 may provide for email security and control, where security management may help to eliminate spam, viruses, spyware and phishing, control of email content, and the like. The security management facility's 122 email security and control may protect against inbound and outbound threats, protect email infrastructure, prevent data leakage, provide spam filtering, and the like. In an embodiment, security management facility 122 may provide for web security and control, where security management may help to detect or block viruses, spyware, malware, unwanted applications, help control web browsing, and the like, which may provide comprehensive web access control enabling safe, productive web browsing. Web security and control may provide Internet use policies, reporting on suspect devices, security and content filtering, active monitoring of network traffic, URI filtering, and the like. In an embodiment, the security management facility 122 may provide for network access control, which may provide control over network connections. Network control may stop unauthorized, guest, or non-compliant systems from accessing networks, and may control network traffic that may not be bypassed from the client level. In addition, network access control may control access to virtual private networks (VPN), where VPNs may be a communications network tunneled through another network, establishing a logical connection acting as a virtual network. In embodiments, a VPN may be treated in the same manner as a physical network.

In an embodiment, the security management facility 122 may provide for host intrusion prevention through behavioral based protection, which may guard against unknown threats by analyzing behavior before software code executes. Behavioral based protection may monitor code when it runs and intervene if the code is deemed to be suspicious or malicious. Advantages of behavioral based protection over runtime protection may include code being prevented from running. Whereas runtime protection may only interrupt code that has already partly executed, behavioral protection can identify malicious code at the gateway or on the file servers and delete the code before it can reach endpoint computers and the like.

In an embodiment, the security management facility 122 may provide for reputation filtering, which may target or identify sources of known malware. For instance, reputation filtering may include lists of URIs of known sources of malware or known suspicious IP addresses, or domains, say for spam, that when detected may invoke an action by the threat management facility 100, such as dropping them immediately. By dropping the source before any interaction can initiate, potential threat sources may be thwarted before any exchange of data can be made.

In embodiments, information may be sent from the enterprise back to a third party, a vendor, or the like, which may lead to improved performance of the threat management facility 100. For example, the types, times, and number of virus interactions that a client experiences may provide useful information for the preventions of future virus threats. This type of feedback may be useful for any aspect of threat detection. Feedback of information may also be associated with behaviors of individuals within the enterprise, such as being associated with most common violations of policy, network access, unauthorized application loading, unauthorized external device use, and the like. In embodiments, this type of information feedback may enable the evaluation or profiling of client actions that are violations of policy that may provide a predictive model for the improvement of enterprise policies.

In an embodiment, the security management facility 122 may provide for the overall security of the enterprise facility 102 network or set of enterprise facility 102 networks, may provide updates of malicious code information to the enterprise facility 102 network, and associated client facilities. The updates may include a planned update, an update in reaction to a threat notice, an update in reaction to a request for an update, an update based on a search of known malicious code information, or the like. The administration facility 134 may provide control over the security management facility 122 when updates are performed. The updates may be automatically transmitted without an administration facility's 134 direct control, manually transmitted by the administration facility 134, or the like. The security management facility 122 may include the management of receiving malicious code descriptions from a provider, distribution of malicious code descriptions to enterprise facility 102 networks, distribution of malicious code descriptions to client facilities, or the like.

The threat management facility 100 may provide a policy management facility 112 that may be able to block non-malicious applications, such as VoIP, instant messaging, peer-to-peer file-sharing, and the like, that may undermine productivity and network performance within the enterprise facility 102. The policy management facility 112 may be a set of rules or policies that may indicate enterprise facility 102 access permissions for the client facility, such as access permissions associated with the network, applications, external computer devices, and the like. The policy management facility 112 may include a database, a text file, a combination of databases and text files, or the like. In an embodiment, a policy database may be a block list, a blacklist, an allowed list, a whitelist, or the like that may provide a list of enterprise facility 102 external network locations/applications that may or may not be accessed by the client facility. The policy management facility 112 may include rules that may be interpreted with respect to an enterprise facility 102 network access request to determine if the request should be allowed. The rules may provide a generic rule for the type of access that may be granted. The rules may be related to the policies of an enterprise facility 102 for access rights for the enterprise facility's 102 client facility. For example, there may be a rule that does not permit access to sporting websites. When a website is requested by the client facility, a security facility may access the rules within a policy facility to determine if the requested access is related to a sporting website. In an embodiment, the security facility may analyze the requested website to determine if the website matches with any of the policy facility rules.

The policy management facility 112 may be similar to the security management facility 122 but with the addition of enterprise facility 102 wide access rules and policies that may be distributed to maintain control of client facility access to enterprise facility 102 network resources. The policies may be defined for application type, subset of application capabilities, organization hierarchy, computer facility type, user type, network location, time of day, connection type, or the like. Policies may be maintained by the administration facility 134, through the threat management facility 100, in association with a third party, or the like. For example, a policy may restrict IM activity to only support personnel for communicating with customers. This may allow communication for departments requiring access, but may maintain the network bandwidth for other activities by restricting the use of IM to only the personnel that need access to instant messaging (IM) in support of the enterprise facility 102. In an embodiment, the policy management facility 112 may be a stand-alone application, may be part of the network server facility 142, may be part of the enterprise facility 102 network, may be part of the client facility, or the like.

In embodiments, the threat management facility 100 may provide configuration management, which may be similar to policy management, but may specifically examine the configuration set of applications, operating systems, hardware, and the like, and manage changes to their configurations. Assessment of a configuration may be made against a standard configuration policy, detection of configuration changes, remediation of improper configuration, application of new configurations, and the like. An enterprise may keep a set of standard configuration rules and policies which may represent the desired state of the device. For example, a client firewall may be running and installed, but in the disabled state, where remediation may be to enable the firewall. In another example, the enterprise may set a rule that disallows the use of USB disks, and sends a configuration change to all clients, which turns off USB drive access via a registry.

In embodiments, the threat management facility 100 may also provide for the removal of applications that may interfere with the operation of the threat management facility 100, such as competitor products that may also be attempting similar threat management functions. The removal of such products may be initiated automatically whenever such products are detected. In the case where such applications are services are provided indirectly through a third-party product, the application may be suspended until action is taken to remove or disable the third-party product's protection facility.

Threat management against a sometimes quickly evolving malware environment may require timely updates, and thus an update management facility 120 may be provided by the threat management facility 100. In addition, a policy management facility 112 may also require update management (e.g., as provided by the update facility 120 herein described). The update management for the security facility 122 and policy management facility 112 may be provided directly by the threat management facility 100, such as by a hosted system or in conjunction with the administration facility 134. In embodiments, the threat management facility 100 may provide for patch management, where a patch may be an update to an operating system, an application, a system tool, or the like, where one of the reasons for the patch is to reduce vulnerability to threats.

In embodiments, the security facility 122 and policy management facility 112 may push information to the enterprise facility 102 network and/or client facility, the enterprise facility 102 network and/or client facility may pull information from the security facility 122 and policy management facility 112 network server facilities 142, there may be a combination of pushing and pulling of information between the security facility 122 and the policy management facility 112 network servers 142, enterprise facility 102 network, and client facilities, or the like. For example, the enterprise facility 102 network and/or client facility may pull information from the security facility 122 and policy management facility 112 network server facility 142 may request the information using the security facility 122 and policy management facility 112 update module; the request may be based on a certain time period, by a certain time, by a date, on demand, or the like. In another example, the security facility 122 and policy management facility 112 network servers 142 may push the information to the enterprise facility's 102 network and/or client facility by providing notification that there are updates available for download and then transmitting the information. The combination of the security management 122 network server facility 142 and security update module may function substantially the same as the policy management facility 112 network server and policy update module by providing information to the enterprise facility 102 network and the client facility in a push or pull method. In an embodiment, the policy management facility 112 and the security facility 122 management update modules may work in concert to provide information to the enterprise facility's 102 network and/or client facility for control of application execution. In an embodiment, the policy update module and security update module may be combined into a single update module.

As threats are identified and characterized, the threat management facility 100 may create definition updates that may be used to allow the threat management facility 100 to detect and remediate the latest malicious software, unwanted applications, configuration and policy changes, and the like. The threat definition facility 114 may contain threat identification updates, also referred to as definition files. A definition file may be a virus identity file that may include definitions of known or potential malicious code. The virus identity (IDE) definition files may provide information that may identify malicious code within files, applications, or the like. The definition files may be accessed by security management facility 122 when scanning files or applications within the client facility for the determination of malicious code that may be within the file or application. The definition files may contain a number of commands, definitions, or instructions, to be parsed and acted upon, or the like. In embodiments, the client facility may be updated with new definition files periodically to provide the client facility with the most recent malicious code definitions; the updating may be performed on a set time period, may be updated on demand from the client facility, may be updated on demand from the network, may be updated on a received malicious code alert, or the like. In an embodiment, the client facility may request an update to the definition files from an update facility 120 within the network, may request updated definition files from a computing facility external to the network, updated definition files may be provided to the client facility 114 from within the network, definition files may be provided to the client facility from an external computing facility from an external network, or the like.

In an embodiment, a definition management facility 114 may provide for the timely updates of definition files information to the network, client facilities, and the like. New and altered malicious code and malicious applications may be continually created and distributed to networks worldwide. The definition files that maintain the definitions of the malicious code and malicious application information for the protection of the networks and client facilities may need continual updating to provide continual defense of the network and client facility from the malicious code and malicious applications. The definition files management may provide for automatic and manual methods of updating the definition files. In embodiments, the network may receive definition files and distribute the definition files to the network client facilities, the client facilities may receive the definition files directly, or the network and client facilities may both receive the definition files, or the like. In an embodiment, the definition files may be updated on a fixed periodic basis, on demand by the network and/or the client facility, as a result of an alert of a new malicious code or malicious application, or the like. In an embodiment, the definition files may be released as a supplemental file to an existing definition files to provide for rapid updating of the definition files.

In a similar manner, the security management facility 122 may be used to scan an outgoing file and verify that the outgoing file is permitted to be transmitted per the enterprise facility 102 rules and policies. By checking outgoing files, the security management facility 122 may be able discover malicious code infected files that were not detected as incoming files as a result of the client facility having been updated with either new definition files or policy management facility 112 information. The definition files may discover the malicious code infected file by having received updates of developing malicious code from the administration facility 134, updates from a definition files provider, or the like. The policy management facility 112 may discover the malicious code infected file by having received new updates from the administration facility 134, from a rules provider, or the like.

The threat management facility 100 may provide for a way to control access to the enterprise facility 102 networks. For instance, the enterprise facility 102 may want to restrict access to certain applications, networks, files, printers, servers, databases, or the like. In addition, the enterprise facility 102 may want to restrict user access under certain conditions, such as the user's location, usage history, need to know, job position, connection type, time of day, method of authentication, client-system configuration, or the like. Network access rules may be developed by the enterprise facility 102, or pre-packaged by a supplier, and managed by the threat management facility 100 in conjunction with the administration facility 134. Network access rules and control may be responsible for determining if a client facility application should be granted access to a requested network location. The network location may be on the same network as the facility or may be on another network. In an embodiment, the network access control may verify access rights for client facilities from within the network or may verify access rights of computer facilities from external networks. When network access for a client facility is denied, the network access control may send an information file to the client facility, the information file may contain data or commands that may provide instructions for the remedial action facility 128. The information sent by the network access facility 124 control may be a data file. The data file may contain a number of commands, definitions, instructions, or the like to be parsed and acted upon through the remedial action facility 128, or the like. The information sent by the network access facility 124 control may be a command or command file that the remedial action facility 128 may access and take action upon.

In an embodiment, the network access rules 124 may provide an information store to be accessed by the network access control. The network access rules facility 124 may include databases such as a block list, a blacklist, an allowed list, a whitelist, an unacceptable network site database, an acceptable network site database, a network site reputation database, or the like of network access locations that may or may not be accessed by the client facility. Additionally, the network access rules facility 124 may incorporate rule evaluation; the rule evaluation may parse network access requests and apply the parsed information to network access rules. The network access rule facility 124 may have a generic set of rules that may be in support of an enterprise facility's 102 network access policies, such as denying access to certain types of websites, controlling instant messenger accesses, or the like. Rule evaluation may include regular expression rule evaluation, or other rule evaluation method for interpreting the network access request and comparing the interpretation to the established rules for network access. In an embodiment, the network access rules facility 124 may receive a rules evaluation request from the network access control and may return the rules evaluation to the network access control.

Similar to the threat definitions facility 114, the network access rule facility 124 may provide updated rules and policies to the enterprise facility 102. The network access rules facility 124 may be maintained by the network administration facility 134, using network access rules facility 124 management. In an embodiment, the network administration facility 134 may be able to maintain a set of access rules manually by adding rules, changing rules, deleting rules, or the like. Additionally, the administration facility 134 may be able to retrieve predefined rule sets from a provider that may provide a set of rules to be applied to an entire enterprise facility 102. The network administration facility 134 may be able to modify the predefined rules as needed for a particular enterprise facility 102 using the network access rules management facility 124.

When a threat or policy violation is detected by the threat management facility 100, the threat management facility 100 may provide for a remedial action facility 128. Remedial action may take a plurality of forms, such as terminating or modifying an ongoing process or interaction, sending a warning to a client or administration facility 134 of an ongoing process or interaction, executing a program or application to remediate against a threat or violation, record interactions for subsequent evaluation, or the like. Remedial action may be associated with an application that responds to information that a client facility network access request has been denied. In an embodiment, when the data file is received, remedial action may parse the data file, interpret the various aspects of the data file, and act on the parsed data file information to determine actions to be taken on an application requesting access to a denied network location. In an embodiment, when the data file is received, remedial action may access the threat definitions to parse the data file and determine an action to be taken on an application requesting access to a denied network location. In an embodiment, the information received from the facility may be a command or a command file. The remedial action facility may carry out any commands that are received or parsed from a data file from the facility without performing any interpretation of the commands. In an embodiment, the remedial action facility may interact with the received information and may perform various actions on a client requesting access to a denied network location. The action may be one or more of continuing to block all requests to a denied network location, a malicious code scan on the application, a malicious code scan on the client facility, quarantine of the application, terminating the application, isolation of the application, isolation of the client facility to a location within the network that restricts network access, blocking a network access port from a client facility, reporting the application to an administration facility 134, or the like.

Remedial action may be provided as a result of a detection of a threat or violation. The detection techniques facility 130 may include monitoring the enterprise facility 102 network or endpoint devices, such as by monitoring streaming data through the gateway, across the network, through routers and hubs, and the like. The detection techniques facility 130 may include monitoring activity and stored files on computing facilities, such as on server facilities 142, desktop computers, laptop computers, other mobile computing devices, and the like. Detection techniques, such as scanning a computer's stored files, may provide the capability of checking files for stored threats, either in the active or passive state. Detection techniques, such as streaming file management, may provide the capability of checking files received at the network, gateway facility, client facility, and the like. This may provide the capability of not allowing a streaming file or portions of the streaming file containing malicious code from entering the client facility, gateway facility, or network. In an embodiment, the streaming file may be broken into blocks of information, and a plurality of virus identities may be used to check each of the blocks of information for malicious code. In an embodiment, any blocks that are not determined to be clear of malicious code may not be delivered to the client facility, gateway facility, or network.

Verifying that the threat management facility 100 is detecting threats and violations to established policy, may require the ability to test the system, either at the system level or for a particular computing component. The testing facility 118 may allow the administration facility 134 to coordinate the testing of the security configurations of client facility computing facilities on a network. The administration facility 134 may be able to send test files to a set of client facility computing facilities to test the ability of the client facility to determine acceptability of the test file. After the test file has been transmitted, a recording facility may record the actions taken by the client facility in reaction to the test file. The recording facility may aggregate the testing information from the client facility and report the testing information to the administration facility 134. The administration facility 134 may be able to determine the level of preparedness of the client facility computing facilities by the reported information. Remedial action may be taken for any of the client facility computing facilities as determined by the administration facility 134; remedial action may be taken by the administration facility 134 or by the user of the client facility.

The threat research facility 132 may provide a continuously ongoing effort to maintain the threat protection capabilities of the threat management facility 100 in light of continuous generation of new or evolved forms of malware. Threat research may include researchers and analysts working on known and emerging malware, such as viruses, rootkits a spyware, as well as other computer threats such as phishing, spam, scams, and the like. In embodiments, through threat research, the threat management facility 100 may be able to provide swift, global responses to the latest threats.

The threat management facility 100 may provide threat protection to the enterprise facility 102, where the enterprise facility 102 may include a plurality of networked components, such as client facility, server facility 142, administration facility 134, firewall 138, gateway, hubs and routers 148, threat management appliance 140, desktop users, mobile users, and the like. In embodiments, it may be the endpoint computer security facility 152, located on a computer's desktop, which may provide threat protection to a user, and associated enterprise facility 102. In embodiments, the term endpoint may refer to a computer system that may source data, receive data, evaluate data, buffer data, or the like (such as a user's desktop computer as an endpoint computer), a firewall as a data evaluation endpoint computer system, a laptop as a mobile endpoint computer, a PDA or tablet as a hand-held endpoint computer, a mobile phone as an endpoint computer, or the like. In embodiments, endpoint may refer to a source or destination for data, including such components where the destination is characterized by an evaluation point for data, and where the data may be sent to a subsequent destination after evaluation. The endpoint computer security facility 152 may be an application loaded onto the computer platform or computer support component, where the application may accommodate the plurality of computer platforms and/or functional requirements of the component. For instance, a client facility computer may be one of a plurality of computer platforms, such as Windows, Macintosh, Linux, and the like, where the endpoint computer security facility 152 may be adapted to the specific platform, while maintaining a uniform product and product services across platforms. Additionally, components may have different functions to serve within the enterprise facility's 102 networked computer-based infrastructure. For instance, computer support components provided as hubs and routers 148, server facility 142, firewalls 138, and the like, may require unique security application software to protect their portion of the system infrastructure, while providing an element in an integrated threat management system that extends out beyond the threat management facility 100 to incorporate all computer resources under its protection.

The enterprise facility 102 may include a plurality of client facility computing platforms on which the endpoint computer security facility 152 is adapted. A client facility computing platform may be a computer system that is able to access a service on another computer, such as a server facility 142, via a network. This client facility server facility 142 model may apply to a plurality of networked applications, such as a client facility connecting to an enterprise facility 102 application server facility 142, a web browser client facility connecting to a web server facility 142, an e-mail client facility retrieving e-mail from an Internet 154 service provider's mail storage servers 142, and the like. In embodiments, traditional large client facility applications may be switched to websites, which may increase the browser's role as a client facility. Clients 144 may be classified as a function of the extent to which they perform their own processing. For instance, client facilities are sometimes classified as a fat client facility or thin client facility. The fat client facility, also known as a thick client facility or rich client facility, may be a client facility that performs the bulk of data processing operations itself, and does not necessarily rely on the server facility 142. The fat client facility may be most common in the form of a personal computer, where the personal computer may operate independent of any server facility 142. Programming environments for fat clients 144 may include CURT, Delphi, Droplets, Java, win32, X11, and the like. Thin clients 144 may offer minimal processing capabilities, for instance, the thin client facility may primarily provide a graphical user interface provided by an application server facility 142, which may perform the bulk of any required data processing. Programming environments for thin clients 144 may include JavaScript/AJAX, ASP, JSP, Ruby on Rails, Python's Django, PHP, and the like. The client facility may also be a mix of the two, such as processing data locally, but relying on a server facility 142 for data storage. As a result, this hybrid client facility may provide benefits from both the fat client facility type, such as multimedia support and high performance, and the thin client facility type, such as high manageability and flexibility. In embodiments, the threat management facility 100, and associated endpoint computer security facility 152, may provide seamless threat protection to the plurality of clients 144, and client facility types, across the enterprise facility 102.

The enterprise facility 102 may include a plurality of server facilities 142, such as application servers, communications servers, file servers, database servers, proxy servers, mail servers, fax servers, game servers, web servers, and the like. A server facility 142, which may also be referred to as a server facility 142 application, server facility 142 operating system, server facility 142 computer, or the like, may be an application program or operating system that accepts client facility connections in order to service requests from clients 144. The server facility 142 application may run on the same computer as the client facility using it, or the server facility 142 and the client facility may be running on different computers and communicating across the network. Server facility 142 applications may be divided among server facility 142 computers, with the dividing depending upon the workload. For instance, under light load conditions all server facility 142 applications may run on a single computer and under heavy load conditions a single server facility 142 application may run on multiple computers. In embodiments, the threat management facility 100 may provide threat protection to server facilities 142 within the enterprise facility 102 as load conditions and application changes are made.

A server facility 142 may also be an appliance facility 140, where the appliance facility 140 provides specific services onto the network. Though the appliance facility 140 is a server facility 142 computer, that may be loaded with a server facility 142 operating system and server facility 142 application, the enterprise facility 102 user may not need to configure it, as the configuration may have been performed by a third party. In an embodiment, an enterprise facility 102 appliance may be a server facility 142 appliance that has been configured and adapted for use with the threat management facility 100 and located within the facilities of the enterprise facility 102. The enterprise facility's 102 threat management appliance may enable the enterprise facility 102 to administer an on-site local managed threat protection configuration, where the administration facility 134 may access the threat resources through an interface, such as a web portal, also referred to as a web-based user portal. In an alternate embodiment, the enterprise facility 102 may be managed remotely from a third party, vendor, or the like, without an appliance facility 140 located within the enterprise facility 102. In this instance, the appliance functionality may be a shared hardware product between pluralities of enterprises 102. In embodiments, the appliance facility 140 may be located at the enterprise facility 102, where the enterprise facility 102 maintains a degree of control. In embodiments, a hosted service may be provided, where the appliance 140 may still be an on-site black box to the enterprise facility 102, physically placed there because of infrastructure requirements, but managed by a third party, vendor, or the like.

Simple server facility 142 appliances may also be utilized across the enterprise facility's 102 network infrastructure, such as switches, routers, wireless routers, hubs and routers, gateways, print servers, net modems, and the like. These simple server facility appliances may not require configuration by the enterprise facility 102 but may require protection from threats via an endpoint computer security facility 152. These appliances may provide interconnection services within the enterprise facility 102 network, and therefore may advance the spread of a threat if not properly protected.

One way for a client facility to be protected from threats from within the enterprise facility 102 network may be a personal firewall. A personal firewall may be an application that controls network traffic to and from a client, permitting or denying communications based on a security policy. Personal firewalls may be designed for use by end-users, which may result in protection for only the computer on which it's installed. Personal firewalls may be able to control network traffic by providing prompts each time a connection is attempted and adapting security policy accordingly. Personal firewalls may also provide some level of intrusion detection, which may allow the software to terminate or block connectivity where it suspects an intrusion is being attempted. Other features that may be provided by a personal firewall may include alerts about outgoing connection attempts, control of program access to networks, hiding the client from port scans by not responding to unsolicited network traffic, monitoring of applications that may be listening for incoming connections, monitoring and regulation of incoming and outgoing network traffic, prevention of unwanted network traffic from installed applications, reporting applications that make connection attempts, reporting destination servers with which applications may be attempting communications, and the like. In embodiments, the personal firewall may be provided by the threat management facility 100.

Another important component that may be protected by an endpoint computer security facility 152 is a network firewall facility 138, which may be a hardware or software device that may be configured to permit, deny, or proxy data through a computer network that has different levels of trust in its source of data. For instance, an internal enterprise facility 102 network may have a high level of trust, because the source of all data has been sourced from within the enterprise facility 102. An example of a low level of trust is the Internet 154, because the source of data may be unknown. A zone with an intermediate trust level, situated between the Internet 154 and a trusted internal network, may be referred to as a "perimeter network." Since firewall facilities 138 represent boundaries between threat levels, the endpoint computer security facility 152 associated with the firewall facility 138 may provide resources that may control the flow of threats at this enterprise facility 102 network entry point. Firewall facilities 138, and associated endpoint computer security facility 152, may also be associated with a network node that may be equipped for interfacing between networks that use different protocols. In embodiments, the endpoint computer security facility 152 may provide threat protection in a plurality of network infrastructure locations, such as at the enterprise facility 102 network entry point, i.e., the firewall facility 138 or gateway; at the server facility 142; at distribution points within the network, i.e., the hubs and routers 148; at the desktop of client facility computers; and the like. In embodiments, the most effective location for threat detection may be at the user's computer desktop endpoint computer security facility 152.

The interface between the threat management facility 100 and the enterprise facility 102, and through the appliance facility 140 to embedded endpoint computer security facilities, may include a set of tools that may be the same for all enterprise implementations, but allow each enterprise to implement different controls. In embodiments, these controls may include both automatic actions and managed actions. Automatic actions may include downloads of the endpoint computer security facility 152 to components of the enterprise facility 102, downloads of updates to existing endpoint computer security facilities of the enterprise facility 102, uploaded network interaction requests from enterprise facility 102 components to the threat management facility 100, and the like. In embodiments, automatic interactions between the enterprise facility 102 and the threat management facility 100 may be configured by the threat management facility 100 and an administration facility 134 in the enterprise facility 102. The administration facility 134 may configure policy rules that determine interactions, such as developing rules for accessing applications, as in who is authorized and when applications may be used; establishing rules for ethical behavior and activities; rules governing the use of entertainment software such as games, or personal use software such as IM and VoIP; rules for determining access to enterprise facility 102 computing resources, including authentication, levels of access, risk assessment, and usage history tracking; rules for when an action is not allowed, such as whether an action is completely deigned or just modified in its execution; and the like. The administration facility 134 may also establish license management, which in turn may further determine interactions associated with a licensed application. In embodiments, interactions between the threat management facility 100 and the enterprise facility 102 may provide threat protection to the enterprise facility 102 by managing the flow of network data into and out of the enterprise facility 102 through automatic actions that may be configured by the threat management facility 100 or the administration facility 134.

Client facilities within the enterprise facility 102 may be connected to the enterprise facility 102 network by way of wired network facilities 148A or wireless network facilities 148B. Client facilities connected to the enterprise facility 102 network via a wired facility 148A or wireless facility 148B may receive similar protection, as both connection types are ultimately connected to the same enterprise facility 102 network, with the same endpoint computer security facility 152, and the same threat protected enterprise facility 102. Mobile wireless facility clients 144B-F, because of their ability to connect to any wireless 148B,D network access point, may connect to the Internet 154 outside the enterprise facility 102, and therefore outside the threat-protected environment of the enterprise facility 102. In this instance the mobile client facility (e.g., the clients 144 B-F), if not for the presence of the endpoint computer security facility 152 may experience a malware attack or perform actions counter to enterprise facility 102 established policies. In addition, there may be a plurality of ways for the threat management facility 100 to protect the out-of-enterprise facility 102 mobile client facility (e.g., the clients 144 D-F) that has an embedded endpoint computer security facility 152, such as by providing URI filtering in personal routers, using a web appliance as a DNS proxy, or the like. Mobile client facilities that are components of the enterprise facility 102 but temporarily outside connectivity with the enterprise facility 102 network may be provided with the same threat protection and policy control as client facilities inside the enterprise facility 102. In addition, mobile the client facilities may receive the same interactions to and from the threat management facility 100 as client facilities inside the enterprise facility 102, where the mobile client facilities may be considered a virtual extension of the enterprise facility 102, receiving all the same services via their embedded endpoint computer security facility 152.

Interactions between the threat management facility 100 and the components of the enterprise facility 102, including mobile client facility extensions of the enterprise facility 102, may ultimately be connected through the Internet 154. Threat management facility 100 downloads and upgrades to the enterprise facility 102 may be passed from the firewalled networks of the threat management facility 100 through to the endpoint computer security facility 152 equipped components of the enterprise facility 102. In turn the endpoint computer security facility 152 components of the enterprise facility 102 may upload policy and access requests back across the Internet 154 and through to the threat management facility 100. The Internet 154 however, is also the path through which threats may be transmitted from their source. These network threats 104 may include threats from a plurality of sources, including without limitation, websites, e-mail, IM, VoIP, application software, and the like. These threats may attempt to attack a mobile enterprise client facility (e.g., the clients 144B-F) equipped with an endpoint computer security facility 152, but in embodiments, as long as the mobile client facility is embedded with an endpoint computer security facility 152, as described above, threats may have no better success than if the mobile client facility were inside the enterprise facility 102.

However, if the mobile client facility were to attempt to connect into an unprotected connection point, such as at a secondary location 108 that is not a part of the enterprise facility 102, the mobile client facility may be required to request network interactions through the threat management facility 100, where contacting the threat management facility 100 may be performed prior to any other network action. In embodiments, the client facility's 144 endpoint computer security facility 152 may manage actions in unprotected network environments such as when the client facility (e.g., client 144F) is in a secondary location 108 or connecting wirelessly to a non-enterprise facility 102 wireless Internet connection, where the endpoint computer security facility 152 may dictate what actions are allowed, blocked, modified, or the like. For instance, if the client facility's 144 endpoint computer security facility 152 is unable to establish a secured connection to the threat management facility 100, the endpoint computer security facility 152 may inform the user of such and recommend that the connection not be made. In the instance when the user chooses to connect despite the recommendation, the endpoint computer security facility 152 may perform specific actions during or after the unprotected connection is made, including running scans during the connection period, running scans after the connection is terminated, storing interactions for subsequent threat and policy evaluation, contacting the threat management facility 100 upon first instance of a secured connection for further actions and or scanning, restricting access to network and local resources, or the like. In embodiments, the endpoint computer security facility 152 may perform specific actions to remediate possible threat incursions or policy violations during or after the unprotected connection.

The secondary location 108 may have no endpoint computer security facilities 152 as a part of its computer components, such as its firewalls 138B, servers 142B, clients 144G, hubs and routers 148C-D, and the like. As a result, the computer components of the secondary location 108 may be open to threat attacks, and become potential sources of threats, as well as any mobile enterprise facility clients 144B-F that may be connected to the secondary location's 108 network. In this instance, these computer components may now unknowingly spread a threat to other components connected to the network.

Some threats may not come directly from the Internet 154, such as from non-enterprise facility controlled mobile devices that are physically brought into the enterprise facility 102 and connected to the enterprise facility 102 client facilities. The connection may be made from direct connection with the enterprise facility's 102 client facility, such as through a USB port, or in physical proximity with the enterprise facility's 102 client facility such that a wireless facility connection can be established, such as through a Bluetooth connection. These physical proximity threats 110 may be another mobile computing device, a portable memory storage device, a mobile communications device, or the like, such as CDs and DVDs, memory sticks, flash drives, external hard drives, cell phones, PDAs, MP3 players, digital cameras, point-to-point devices, digital picture frames, digital pens, navigation devices, tablets, appliances, and the like. A physical proximity threat 110 may have been previously infiltrated by network threats while connected to an unprotected network connection outside the enterprise facility 102, and when connected to the enterprise facility 102 client facility, pose a threat. Because of their mobile nature, physical proximity threats 110 may infiltrate computing resources in any location, such as being physically brought into the enterprise facility 102 site, connected to an enterprise facility 102 client facility while that client facility is mobile, plugged into an unprotected client facility at a secondary location 108, and the like. A mobile device, once connected to an unprotected computer resource, may become a physical proximity threat 110. In embodiments, the endpoint computer security facility 152 may provide enterprise facility 102 computing resources with threat protection against physical proximity threats 110, for instance, through scanning the device prior to allowing data transfers, through security validation certificates, through establishing a safe zone within the enterprise facility 102 computing resource to transfer data into for evaluation, and the like.

Having provided an overall context for threat detection, the description now turns to a brief discussion of embodiments of the present concept, followed by a description of devices, systems, and methods for managing unsubscribe links acquired from incoming email messages.

Figure 2:
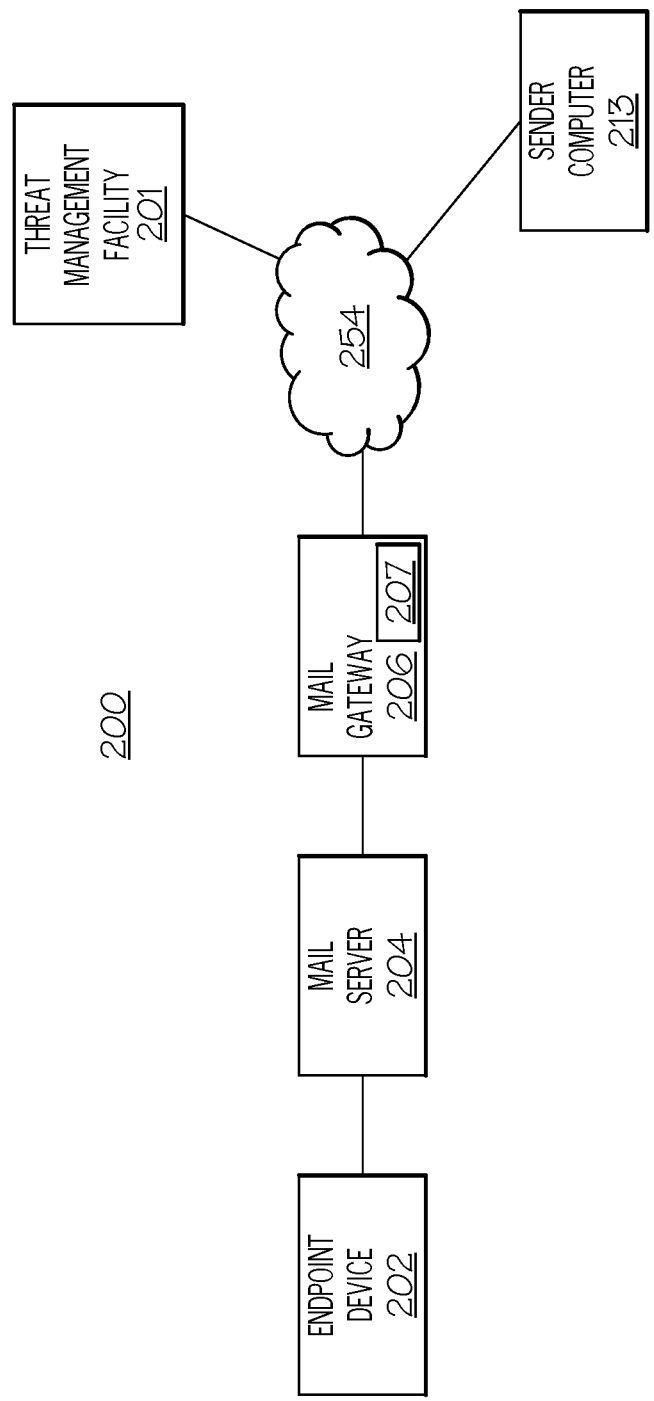
FIG. 2 is a diagram of an email processing system, in accordance with an example embodiment.

FIG. 2 is a diagram of an email processing system 200. Some or all of the email processing system 200 may be part of and implemented in the threat management facility 100 of FIG. 1. Alternatively, some or all of the email processing system 200 may be separate from but in communication with a threat management facility 201.

The email processing system 200 includes an endpoint device 202, a mail server 204, a mail gateway 206, and a network 254. In some embodiments, the email processing system 200 includes the mail server 204 and the mail gateway 206, and email processing hardware and/or software components of the endpoint device 202 and network 254 but may not include the entire endpoint device 202 and network 254.

In the email processing system 200, one or more sender computers 213 may exchange data, for example, email or the like, with one or more endpoint devices 202 of an intended recipient of the email or the like via the network 254. Examples of a network may include, but are not limited to, a public switched telephone network (PSTN), wireless network such as a cellular network for mobile devices, a GPS network, a WiFi network, a private or public data communication network such as the Internet 154 shown in FIG. 1, a virtual network, a cloud computing network, or a combination thereof. The endpoint devices 202 may be similar to, include, or be part of a client 144 described with reference to FIG. 1. The endpoint devices 202 may execute an email client application or program such as Microsoft Outlook™, Thunderbird™, Apple Mail™, or the like, which may be part of the email processing system 200 and that permit email addresses to be configured for the purpose of receiving solicited and unsolicited messages, for example, email generated by the sender computer 213. For example, the email program (not shown) can be stored in the memory of the endpoint device 202 for which a message is directed.

The endpoint device 202 may be at an enterprise facility, for example, enterprise facility 102 shown in FIG. 1, which may also include other elements of the network environment in which the email processing system 200 is implemented, such as one or more laptops, desktops, servers, gateways, communication ports, handheld or mobile devices, firewalls, and the like. Here, the enterprise facility 102 can include the mail server 204, the mail gateway 206, and at least part of the network 254. For example, the mail server 204 can be part of a server 142 and the mail gateway 206 can be part of or include a firewall 138 described with respect to FIG. 1, and the network devices 148A-B of FIG. 1 can be part of the network 254. In some embodiments, the mail server 204 is part of the mail gateway 206.

The mail gateway 206 is generally positioned at the edge of the network for receiving email and running security scans against it. In operation, incoming email from the sender computer 213 is received from the network 254 by the mail gateway 206 or the like. In some embodiments, the mail gateway 206 is an on-premise gateway computer. In other embodiments, the mail gateway 206 is implemented at a cloud-based mail gateway service. The mail gateway 206 can perform security check operations such as anti-spam, malware, and/or reputation checks on incoming email, or more specifically, the unsubscribe links of the email. In doing so, the mail gateway 206 can implement commercially available products such as Central Mail, Sophos Firewall, and the like to perform security check operations. The mail gateway 206 may include an intrusion detection system (IDS)/intrusion protection system (IPS) and/or other network security devices that monitors incoming email for possible malicious activity and can take action against such data, e.g., reporting, blocking, or removing detected malicious data to prevent it from receipt by the endpoint device 202 of the intended recipient.

The mail server 204 can include an incoming mail server, an outgoing mail server, and a database or the like for temporarily storing and queuing received email received from the mail gateway 206 for delivery to the user device. The outgoing mail server can retrieve the email from the database for output to the endpoint device 202. The database of the mail server 204 is distinguished from a database 207 of the mail gateway 206, but either database may be configured to process email records including unsubscribe links, metadata, and so on. The endpoint device 202 includes a mail client or the like to read the email received from the mail server 104.

In some embodiments, a web portal may access threat resources and may be further configured to present collected unsubscribe links in various ways to a user of the endpoint device 202. FIG. 8 illustrates an example of a web portal 800. The web portal may be managed by the administration facility 134 of FIG. 1, for example. In some embodiments, the user portal can permit a user to view and release spam messages held in quarantine, change user preferences, specify network access, provide VPN client downloads, blacklist management, and provide information regarding unsubscribe links and corresponding email messages.

In some embodiments, the mail gateway 206 can include a storage device 207 such as a database, cache, or other memory and corresponding processor to execute an email digest algorithm that combines a plurality of email messages during a predetermined time period, e.g., day, week, month, etc., or when a predetermined volume limit is reached, e.g., every 10 or 100 messages, into a single message. In other embodiments, a computer of the threat management facility 100 of FIG. 1 or a third-party remote computer can provide an email digest. In some embodiments, the digest is a spam digest, which can be formatted in a personalized manner, for example, as shown in FIG. 7.

In some embodiments, the mail gateway 206 and/or mail server 204 may perform a reputation check operation on the unsubscribe links or metadata identified in the received email messages. During a reputation check operation, the mail gateway 206 and/or mail server 204 may communicate with a reputation scoring system, which stores reputation information such as a sender score that identifies the quality of the reputation of the sender of an email. In some embodiments, a reputation scoring system may be part of the network access rules facility 124 of FIG. 1. Also stored may include IP addresses, URL/URI addresses, or other sender identifiers corresponding to an email sender known to be associated with downloading malware or other security threat data. The system 200 may compare a sender identifier such as an IP address of a sender stored by the reputation scoring system with an IP address of an email address received by the system 200 and determine from the sender score corresponding to the IP address the reputation of the sender. The result of a reputation check operation may be used by the threat management facility 100 to perform a reputation filtering operation to check a URI of an unsubscribe link against a list of URIs of known sources of malware or suspicious IP address known to be associated with downloading security threat software.

In operation, the endpoint device 202 can be configured to communicate over the network 254 via the mail gateway 206. The endpoint device 202 can include at least one processor coupled to a computer readable medium having software instructions stored thereon that, when executed by the processor, causes the endpoint processor to perform a combination of email and network security operations including a receipt of email from one or more sender computers 213 and an optional activation of unsubscribe links to prevent future email from being received from the sender computers 213. A network security operation can include a security check performed on the endpoint device 202 by a combination of the mail server 204 and/or mail gateway 206, for example a firewall, in communication with the threat management facility 100 of FIG. 1 commensurate with an email exchange with a sender computer 213. In some embodiments, the endpoint device 202, mail server 204, and/or the mail gateway 206 may perform network security operations in connection with elements of the threat management facility 100 of FIG. 1. The endpoint device 202, mail server 204, and mail gateway 206 (and/or other network device(s)) can each be configured to perform a plurality of security tasks and to communicate over the network 254. Security tasks can include receiving data from the threat management facility 100 and/or an external data source, analyzing the email messages received at the email processing system 200 to identify a threat or a potential threat, and responding to the detected events. In some implementations, the endpoint device 202 can perform one or more security tasks. A network device of the network 254 and/or the gateway computer 206 such as a firewall can be configured to automatically determine any non-redundant security tasks (security tasks not performed by the endpoint).

Figure 3:
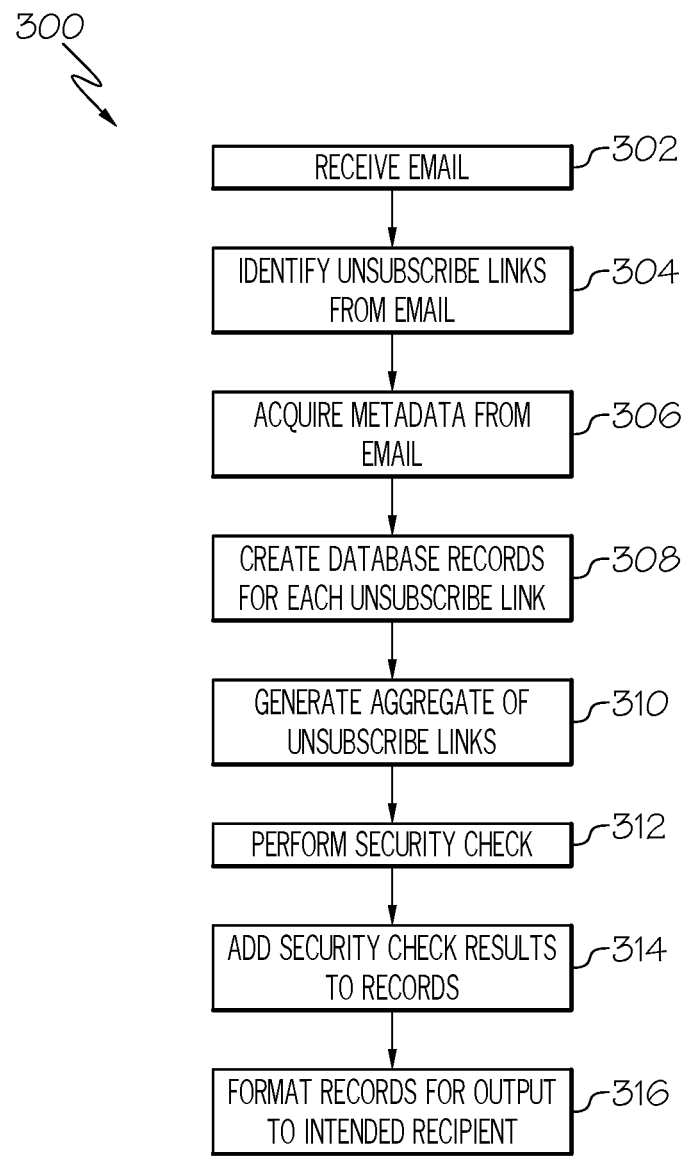
FIG. 3 is a flowchart of a method for collecting unsubscribe links in received email and editing the collected unsubscribe links in a personalized manner, in accordance with an example embodiment.

FIG. 3 is a flowchart of a method 300 for processing incoming email that includes unsubscribe links, in accordance with an example embodiment. In describing the method 300, reference is made to elements of the threat management system 100 of FIG. 1 and email processing system 200 of FIG. 2.

The method 300 begins at block 302, where a plurality of email messages are received by the email processing system 200 from one or more sender computers 213.

At block 304, the email messages are parsed and/or analyzed to identify a plurality of unsubscribe links. Other analysis may be performed on the email messages. For example, as described in FIG. 1, the threat management facility 100 may receive emails from the email processing system 200 and perform a further analysis to identify a threat or a potential threat and respond to the detected event accordingly.

At block 306, the email messages are further parsed to selectively extract metadata that describes the email contents included in the email messages, including text, images, video, and so on. The analysis techniques described with respect to the unsubscribe links can equally apply to the metadata and not repeated for brevity. Metadata may include data that provides context to the email message, for example, the email address of the sender and recipient, the subject, time sent, and so on. In some embodiments, additional metadata includes reputation-related information about the unsubscribe link of interest.

At block 308, a database record is created for each email message having an identified unsubscribe link. The record for a particular email message is created to include the metadata and identified unsubscribe link of the email message. The database records of the collected unsubscribe links can be stored at a database 207 at the mail gateway 206 of the email processing system 200, which may also perform security-related operations against the links. Alternatively, the database records may be generated by the email processing system 200, but stored at a remote location, for example, a database of the threat management facility 100.

At block 310, the email processing system 200 generates a collection or aggregate of the identified unsubscribed links. For example, the unsubscribed links can be parsed from email messages received by the mail gateway 206 during a predetermined period of time, for example, every hour, day, week, month, etc. Database records can be arranged according to the predetermined period of time, for example, a first arrangement of records including a first aggregate of unsubscribe links corresponding to a particular 24-hour period during which emails are received and processed by the email processing system, a second arrangement of records including a second aggregate of unsubscribe links corresponding to the next 24-hour period, and so on.

At block 312, a security check operation is performed on the unsubscribe links, for example, an anti-spam, malware, or reputation check on the email message. The email processing system 220 and/or threat management facility 100 may contribute to some or all of a security check operation. In some embodiments, a general security check operation can be performed at the mail gateway 206, for example, an anti-spam, malware, or other security threat check, prior to parsing an email message for an unsubscribe link. In other embodiments, a security check operation is performed on the collected unsubscribe links at the database, i.e., after the email message is parsed. At block 314, results generated by a security check operation can be added as entries to generated records along with the corresponding unsubscribe links undergoing the security check operation.

In some embodiments, a data source that may perform a security check operation such as an anti-spam or malware check on incoming email may include a security management facility 122 of the threat management facility 100. In some embodiments, for each unsubscribe link, the security check operation may include a reputation check operation, described above, which can be performed to verify the integrity of the email sender. The reputation filtering operation can block unwanted emails having a known bad reputation determined by the reputation check operation from entering the intended recipient's network.

At block 316, the records including the aggregated unsubscribe links, metadata, and safety check results are formatted according to a user-defined predetermined format for output to the intended recipient. The results of a security check operation may be presented to the user indicating that the unsubscribe link can be safely used, or whether it is potentially malicious and unsafe to use. In some embodiments, an unsubscribe link can be modified to prevent a user from accessing an unknown or undesirable website or other source to which the link is directed.

This prevents a user from selecting a link that may be the potential for unintentionally receiving malware, and to block the malware upon reception before the malware has the chance to do any damage. The display format of the layout of records including links, metadata, and security result information may be a table included in the body of an email message as shown in FIG. 5 or 6, a mail digest as shown in FIG. 7, or a web portal as shown in FIG. 8, although other display formats may equally apply.

Figure 4:
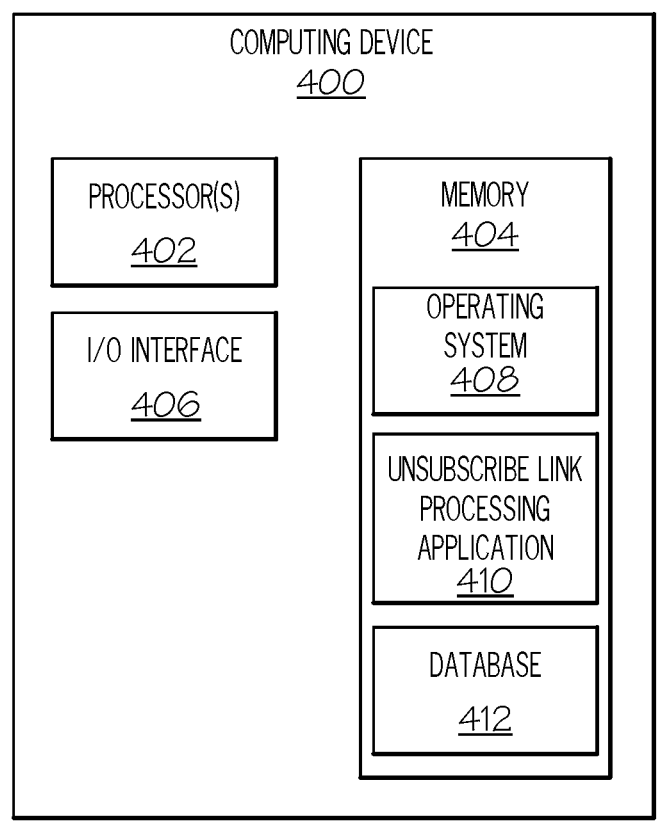
FIG. 4 is a diagram of a computing device configured for processing a collection of unsubscribe links, in accordance with an example embodiment.

Referring to FIG. 4, a computing device 400 may be implemented in the email processing system 200 of FIG. 2, and therefore, some or all method steps of method 300 can be executed by the computing device 400. The computing device 400 may include one or more processors 402, non-transitory computer readable medium or memory 404, I/O interface devices 406, which may include a network interface for wired or wireless communications. The computer readable medium 404 may store an operating system 408, an unsubscribe link processing application 410, and a data section 412.

The computing device 400 may be along the path from the network 245 (see FIG. 2) to the end device 202 and the unsubscribe link processing application 410 may be constructed and arranged to identify unsubscribe links and metadata in the content of a received email message. An "application" or "module" may refer to a hardware-based module, software-based application or module or may be a combination of hardware and software. Embodiments of hardware-based modules may include self-contained components such as chipsets, specialized circuitry and one or more memory devices, while a software-based module may be part of a program code or linked to the program code containing specific programmed instructions, which may be loaded in the memory device 404 of the computer system. An application or module (whether hardware, software, or a combination thereof) may be designed to implement or execute one or more particular described functions or routines. In some embodiments, the computer 400 may be part of the mail gateway computer 206. In other embodiments, the computer 400 is a standalone device that communicates via a wired or wireless connection with the mail gateway computer 206 for receiving the email messages for analysis.

In operation, the processor 402 may execute the application 410 stored in the computer readable medium 404. The unsubscribe link processing application 410 may include software instructions that, when executed by the processor 402, cause the processor 402 to perform operations for parsing electronic messages to identify unsubscribe links and corresponding metadata for further processing, for example, undergo a security check operation, generate records stored at the data section 412 or remote database, and so on, and/or form an aggregate of the unsubscribe links for transmittal to a user such as the intended recipient of the electronic messages. In doing so, the computing device 400 may communicate with other devices (e.g., threat management facility 100, sender computer(s) 213) via the I/O interfaces 406.

FIG. 5 is an illustrative example of email messages 500A, 500B, 500C (generally, 500) processed to generate a table 520 displaying an aggregate of unsubscribe links and corresponding metadata based on records stored at a database, in accordance with an example embodiment.

As shown in FIG. 5, a representative email message 500A comprises a sender's address 502, a recipient's address 504, a time stamp 506, a subject line 508, an attachment indicator 509, and a body text 510. The email message also includes an unsubscribe link 512.

A table 520 can be constructed and arranged, for example, by an on-premise or cloud mail gateway or firewall or other email processing device such as the gateway 206 of FIG. 2, to include relevant parsed contents of the email messages 500A-500C that may be useful for a user to render a decision whether to activate a particular unsubscribe link of a received email message. For example, each row of the table 520 can include columns each including a sender's address field 522, a received field 524, a subject field 526, a content field 528, an unsubscribe link field 530. The sender's address field 522 can include the sender's address 502 of the first email message 500A and the sender's addresses of the second email message 500B and third email message 500C, respectively. Similarly, the received fields 524 can include the time stamp 506, the subject fields 526 can include the subject lines 508, the content fields 528 can include a screenshot of the attachment 509 and/or other body text content 510, and the unsubscribe link fields can include the unsubscribe links 530. The table 520 may include other fields not shown but equally apply. The table 520 can be stored in a database, for example, the database 207 of the mail gateway 206.

FIG. 6 is an illustrative example of another table 620. The table 620 may include a sender's address field 622, a received field 624, a subject field 626, a content field 628, an unsubscribe link field 630 similar to the fields described in the table 520 of FIG. 5 so details thereof are not repeated for brevity.

In addition, the table 620 may include results of a security check operation such as a safety check, reputation check, and the like may be performed by the threat management facility 100 on the contents of the email messages parsed by the system and provided in the table 620. The results of the security operation may be displayed in fields 632, 634, and 626. In particular, a safety check link field 632 may include a result indicating whether the unsubscribe link in field 630 satisfies a predetermined security threshold, for example, a reputation filtering operation on the identified unsubscribe link determining that the link is "safe" by comparing a uniform resource indicator (URI) of an unsubscribe link of the identified unsubscribe links and a list of URIs known to be associated with downloading security threat software. A safety check sender field 634 may include a result indicating that the reputation of the sender of the unsubscribe link is secure and safe. An additional field 636 may provide additional information regarding the integrity of the unsubscribe link, for example, indicating the highest possible degree of confidence that the unsubscribe link is secure based on additional safety check operations performed on the unsubscribe link.

FIG. 7 is an illustrative example of a screenshot of a message provided by an email digest 700. The digest 700 can be a spam digest or the like, which can be formatted in a predetermined and personalized manner, for example, an email including a table similar to the table 600 shown in FIG. 6 or other display format. The email can be automatically generated by an electronic mailing list, and which combines collected unsubscribe links and corresponding metadata during a time period (e.g., day, week, month, etc.) or when a volume limit is reached (e.g. every 10 or 100 messages) into a single message.

FIG. 8 is an illustrative example of a screenshot of a display provided by a user unsubscribe web portal 800. The web portal 800 can display a table similar to the table 600 shown in FIG. 6 or other display format. The web portal 800 may permit users such as an intended email recipient to view email messages held in quarantine, for example, email messages identified by a safety check to be potentially malicious, harmful, or otherwise illegitimate.

Figure 9:
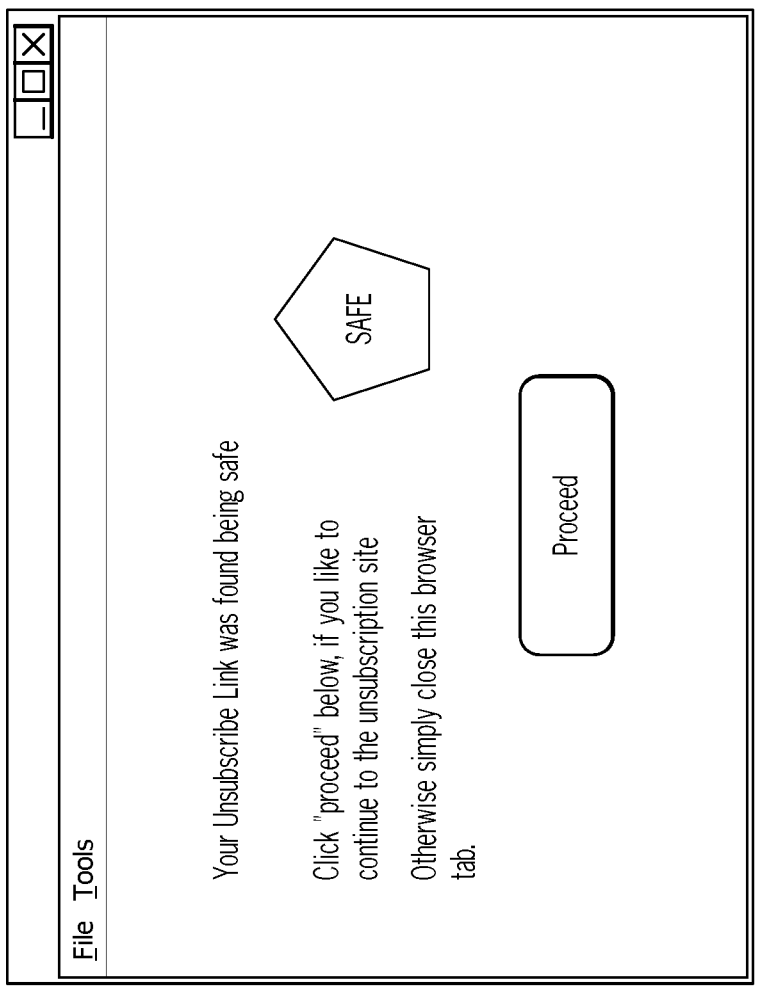
FIG. 9 is an illustrative example of an email message generated to inform a user of an unsubscribe link safety check result, in accordance with an example embodiment.

FIG. 9 is an illustrative example of an email message informing a recipient of an unsubscribe link safety check result, in accordance with an example embodiment. As described above, the results of a security check operation may be presented to the user indicating that a unsubscribe link of interest can be safely used, or whether it is potentially malicious and unsafe to use. In some embodiments, the system can specify an action to be performed for an unsubscribe link of interest. Example actions may include blocking a URL marked with a high-risk level, allowing a URL marked with a low risk level to be accessed, and providing a warning (e.g., shown in FIGS. 7 and 8) for a URL marked with a medium risk level. In some instances, the system may modify, or rewrite, an unsubscribe link so that it can be safely used or prevented from accessing a malicious website. For example, an unsubscribe link may be rewritten to allow checking a target's time of access or other relevant information. This feature can be enhanced by monitoring recognized access attempts to unsubscribe links and executing real-time safety data when a user selects an unsubscribe link from an email message, or from a web portal, digest email, or the like that displays an aggregate of collected unsubscribe links. As shown in FIG. 9, when a user selects an unsubscribe link, a display message 900 can be presented to the user with information regarding the result of a security operation, for example, confirming that the unsubscribe link is safe. For example, the reputation or safety status of an unsubscribe link of interest displayed at an email digest or web portal may have changed since a previous check operation, and the display message 900 can provide additional security with respect to confirming a user's interest in proceeding with an unsubscribe process.

In this manner, the foregoing systems, devices, and methods provide a mechanism by which an email recipient can efficiently determine which websites or mailing lists from which to unsubscribe. In addition, additional security techniques can be applied to ensure that the unsubscribe links are authenticated prior to selection of the unsubscribe links of interest. This can minimize the amount of email traffic received by a user because it allows the user to more readily understand the source of the subscription, and more easily unsubscribe than an unsubscribe operation on an email-by-email basis.

Although the foregoing Figures illustrate various embodiments of the disclosed systems and methods, additional and/or alternative embodiments are contemplated as falling within the scope of this disclosure. For example, in one embodiment, this disclosure provides a method for processing electronic messages including unsubscribe links, where the method includes receiving, at a computer system of a communication network, a plurality of electronic messages directed from a sender to an intended recipient, wherein at least one electronic message from the plurality of electronic messages includes an unsubscribe link that is associated with an instruction that instructs the sender to discontinue sending electronic messages to the intended recipient, parsing, by one or more processors of the computer system, the electronic messages to identify unsubscribe links from the plurality of electronic messages, and for each identified unsubscribe link, creating, by the one or more processors of the computer system, a record associated with the identified unsubscribe link in a database. The method may also include generating, by the one or more processors of the computer system, an aggregate of the identified unsubscribe links based on the records in the database, and transmitting the aggregate of the identified unsubscribe links to the intended recipient.

In another embodiment of the method, the method includes acquiring, by the one or more processors of the computer system, metadata from each electronic message having an identified unsubscribe link, the metadata including information about a combination of each electronic message and the identified unsubscribe link of each electronic message, and providing, by the computer system, the metadata with the identified unsubscribe links in the records in the database.

In another embodiment of the method, the method includes displaying, at an electronic device of the intended recipient, the metadata and the identified unsubscribe link from each electronic message in a predetermined format.

In another embodiment of the method, the method includes formatting the arrangement of the records for display by an electronic device of the intended recipient, and configuring the database to provide the formatted arrangement of the records including the aggregate of the unsubscribe links and the metadata at a predetermined time.

In another embodiment of the method, the method further comprises performing a security check operation on the identified unsubscribe links; determining in response to the security check operation a security threat by a non-secure unsubscribe link of the identified unsubscribe links; and modifying the non-secure unsubscribe link to protect the intended recipient against the security threat.

In another embodiment of the method, performing the security check operation on the identified unsubscribe links comprises: performing a reputation filtering operation on the identified unsubscribe links by comparing a uniform resource indicator (URI) of an unsubscribe link of the identified unsubscribe links and a list of URIs known to be associated with downloading security threat software; and adding data result of the comparison to the record.

In another embodiment of the method, in response to a match between the URI of the unsubscribe link and a URI known to be associated with downloading security threat software, modifying the electronic messages or removing the unsubscribe links from the electronic messages to prevent access to websites that may launch malicious code against an electronic device of the intended recipient.

In another embodiment of the method, the method further comprises receiving and storing new unsubscribe links from new electronic messages at the database; formatting an aggregate of the new unsubscribe links for display by an electronic device of the intended recipient; and configuring the database to output the formatted aggregate of the new unsubscribe links at predetermined intervals.

In another embodiment of the method, the method further comprises performing a safety check process to determine whether the unsubscribe link from each of the plurality of electronic messages satisfies a security threshold; providing access for the intended recipient to the unsubscribe link from each of the plurality of electronic messages in response to a determination that the unsubscribe link from each of the plurality of electronic messages satisfies the security threshold; and modifying or removing the unsubscribe link in response to a determination that the unsubscribe link from each of the plurality of electronic messages fails to satisfy the security threshold.

In another embodiment of the method, the safety check process is performed in response to an attempted activation of at least one unsubscribe link of the plurality of unsubscribe links.

In another example, in another embodiment, this disclosure provides a computer system, comprising: one or more processors; and one or more memory devices contain program code executable by the one or more processors to implement a method for managing unsubscribe links, the method comprising: receiving, at a computer system of a communication network, a plurality of electronic messages directed from a sender to an intended recipient, wherein at least one electronic message from the plurality of electronic messages includes an unsubscribe link that is associated with an instruction that instructs the sender to discontinue sending electronic messages to the intended recipient; parsing, by one or more processors of the computer system, the electronic messages to identify unsubscribe links from the plurality of electronic messages; for each identified unsubscribe link, creating, by the one or more processors of the computer system, a record associated with the identified unsubscribe link in a database; generating, by the one or more processors of the computer system, an aggregate of the unsubscribe links based on the records in the database; and transmitting the aggregate of the identified unsubscribe links to the intended recipient.

In another embodiment of the computer system, the method further comprises: acquiring, by the one or more processors of the computer system, metadata from each electronic message having an identified unsubscribe link, the metadata including information about a combination of the electronic message and the identified unsubscribe link; and providing, by the computer system, the metadata with the identified unsubscribe link in the record in the database.

In another embodiment of the computer system, the method further comprises: formatting the arrangement of the records for display by an electronic device of the intended recipient; and configuring the database to provide the formatted arrangement of the records including the aggregate of the unsubscribe links and the metadata at a predetermined time.

In another embodiment of the computer system, the method further comprises: performing a security check operation on the identified unsubscribe links; determining in response to the security check operation a security threat by a non-secure unsubscribe link of the identified unsubscribe links; and modifying the non-secure unsubscribe link to protect the intended recipient against the security threat.

In another embodiment of the computer system, performing the security check operation on the identified unsubscribe links comprises: performing a reputation filtering operation on the identified unsubscribe links by comparing a uniform resource indicator (URI) of an unsubscribe link of the identified unsubscribe links and a list of URIs known to be associated with downloading security threat software; and adding data result of the comparison to the record.

In another embodiment of the computer system, the method further comprises receiving and storing new unsubscribe links from new electronic messages at the database; formatting an aggregate of the new unsubscribe links for display by an electronic device of the intended recipient; and configuring the database to output the formatted aggregate of the new unsubscribe links at predetermined intervals.

In another example, in another embodiment, this disclosure provides computer program product for managing unsubscribe links, the computer program product comprising: one or more computer readable storage media having computer readable program code collectively stored on the one or more computer readable storage media, the computer readable program code being executed by one or more processors of a computer system to cause the computer system to perform a method comprising: receiving, at a computer system of a communication network, a plurality of electronic messages directed from a sender to an intended recipient, wherein at least one electronic message from the plurality of electronic messages includes an unsubscribe link that is associated with an instruction that instructs the sender to discontinue sending electronic messages to the intended recipient; parsing, by one or more processors of the computer system, the electronic messages to identify unsubscribe links from the plurality of electronic messages; for each identified unsubscribe link, creating, by the one or more processors of the computer system, a record associated with the identified unsubscribe link in a database; generating, by the one or more processors of the computer system, an aggregate of the identified unsubscribe links based on the records in the database; and transmitting the aggregate of the identified unsubscribe links to the intended recipient.

In another embodiment of the computer program product, the method further comprises: acquiring, by the one or more processors of the computer system, metadata from each electronic message having an identified unsubscribe link, the metadata including information about a combination of the electronic message and the identified unsubscribe link; and providing, by the computer system, the metadata with the identified unsubscribe link in the record in the database.

In another embodiment of the computer program product, the method further comprises: formatting the arrangement of the records for display by an electronic device of the intended recipient; and configuring the database to provide the formatted arrangement of the records including the aggregate of the unsubscribe links and the metadata at a predetermined time.

In another embodiment of the computer program product, the method further comprises: performing a security check operation on the identified unsubscribe links; determining in response to the security check operation a security threat by a non-secure unsubscribe link of the identified unsubscribe links; and modifying the non-secure unsubscribe link to protect the intended recipient against the security threat.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Disclosed embodiments may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random-access memory associated with a processor), or a storage device such as a disk drive, flash memory or any other optical, electromagnetic, magnetic, infrared or other device or combination of devices. In another aspect, any of the systems and methods described above may be embodied in any suitable transmission or propagation medium carrying computer-executable code and/or any inputs or outputs from same.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions.

Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it may be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context. Absent an explicit indication to the contrary, the disclosed steps may be modified, supplemented, omitted, and/or re-ordered without departing from the scope of this disclosure.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So, for example, performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It should further be appreciated that the methods above are provided by way of example. Absent an explicit indication to the contrary, the disclosed steps may be modified, supplemented, omitted, and/or re-ordered without departing from the scope of this disclosure.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

The invention claimed is:

1. A method for processing electronic messages including unsubscribe links, comprising:
    receiving at a computer system a plurality of electronic messages directed from a sender, wherein at least one electronic message from the plurality of electronic messages includes an unsubscribe link that is associated with an instruction that instructs the sender to discontinue sending electronic messages;
    parsing, by one or more processors of the computer system, the electronic messages to identify the unsubscribe link included in the least one electronic message;
    creating, by the one or more processors of the computer system, a record associated with the identified unsubscribe link in a database;
    acquiring, for the at least one electronic message, metadata including information about the at least one electronic message and information about the identified unsubscribe link;
    providing, by the computer system, the metadata with the identified unsubscribe link in the record in the database;
    generating, by the one or more processors of the computer system, a table for display at a computer including the identified unsubscribe link based on the record in the database, the table further including a sender email address of the metadata for the identified unsubscribe link; and
    transmitting the table including the identified unsubscribe link to the computer.

2. The method of claim 1, further comprising:
    displaying, in the table at an electronic device of an intended recipient, the metadata and identified unsubscribe link in a predetermined format.

3. The method of claim 1, wherein the table includes a plurality of records, and the method further comprises:
    formatting the arrangement of the plurality of records for display by an electronic device of an intended recipient; and
    configuring the database to provide the formatted arrangement of the records including the identified unsubscribe link and the metadata at a predetermined time.

4. The method of claim 1, further comprising:
    performing a security check operation on the identified unsubscribe link;
    determining, in response to the security check operation, a security threat by the identified unsubscribe link; and modifying the identified unsubscribe link to protect the computer against the security threat.

5. The method of claim 4, wherein the unsubscribe link of the each of the plurality of electronic messages has a uniform resource indicator (URI), and wherein performing the security check operation on the identified unsubscribe links comprises:
performing a reputation filtering operation on the identified unsubscribe link by performing a comparison of the URI and a list of URIs known to be associated with downloading security threat software; and
adding a data result including a status of the comparison to the table.

6. The method of claim 5, further comprising:
in response to a match between the URI of the unsubscribe link and a URI known to be associated with downloading security threat software, modifying the at least one electronic message or removing the identified unsubscribe link from the at least one electronic message to prevent access to a website associated with the security threat software.

7. The method of claim 1, further comprising:
receiving and storing new unsubscribe links from new electronic messages at the database;
formatting an aggregate of the new unsubscribe links for display by an electronic device of the intended recipient; and
configuring the database to output the formatted aggregate of the new unsubscribe links at predetermined intervals.

8. The method of claim 1, wherein one or more electronic messages of the plurality of electronic messages includes a corresponding unsubscribe link, and the method further comprises:
performing a safety check process to determine whether each unsubscribe link of the one or more electronic messages satisfies a security threshold;
providing access for the intended recipient to a first unsubscribe link of the one or more electronic messages in response to a determination that the first unsubscribe link satisfies the security threshold; and
modifying or removing a second unsubscribe link of the one or more electronic messages in response to a determination that the second unsubscribe link fails to satisfy the security threshold.

9. The method of claim 8, wherein the safety check process is performed in response to an attempted activation of an unsubscribe link of an electronic message selected from the one or more electronic messages.

10. A computer system, comprising:
one or more processors; and
one or more memory devices containing program code executable by the one or more processors to implement a method for managing unsubscribe links, the method comprising:
receiving, at a computer system, a plurality of electronic messages directed from a sender, wherein at least one electronic message from the plurality of electronic messages includes an unsubscribe link that is associated with an instruction that instructs the sender to discontinue sending electronic messages,
parsing, by the one or more processors of the computer system, the electronic messages to identify the unsubscribe link included in the least one electronic message;
creating, by the one or more processors of the computer system, a record associated with the identified unsubscribe link in a database;
acquiring, for the at least one electronic message, metadata including information about the at least one electronic message and information about the identified unsubscribe link;
providing, by the computer system, the metadata with the identified unsubscribe link of the at least one electronic message in the records in the database;
generating, by the one or more processors of the computer system, a table for display at a computer including the identified unsubscribe links based on the records in the database, the table further including a sender email address of the metadata for the identified unsubscribe link; and
transmitting the table including the identified unsubscribe link to the computer.

11. The computer system of claim 10, wherein the table includes a plurality of records, and the method further comprises:
formatting the arrangement of the plurality of records for display by an electronic device of an intended recipient; and
configuring the database to provide the formatted arrangement of the records including the identified unsubscribe links and the metadata at a predetermined time.

12. The computer system of claim 10, wherein the method further comprises:
performing a security check operation on the identified unsubscribe link;
determining in response to the security check operation a security threat by the identified unsubscribe link; and
modifying the identified unsubscribe link to protect the computer against the security threat.

13. The computer system of claim 12, wherein the unsubscribe link of the each of the plurality of electronic messages has a uniform resource indicator (URI), and wherein performing the security check operation on the identified unsubscribe links comprises:
performing a reputation filtering operation on the identified unsubscribe links by performing a comparison of the URI and a list of URIs known to be associated with downloading security threat software; and
adding a data result including a status of the comparison to the table.

14. The computer system of claim 10, wherein the method further comprises:
receiving and storing new unsubscribe links from new electronic messages at the database;
formatting an aggregate of the new unsubscribe links for display by an electronic device of the intended recipient; and
configuring the database to output the formatted aggregate of the new unsubscribe links at predetermined intervals.

15. A computer program product for managing unsubscribe links, the computer program product comprising:
one or more computer readable storage media having computer readable program code collectively stored on the one or more computer readable storage media, the computer readable program code being executed by one or more processors of a computer system to cause the computer system to perform a method comprising:
receiving, at a computer system a plurality of electronic messages directed from a sender, wherein at least one electronic message from the plurality of electronic messages includes an unsubscribe link that is associated with an instruction that instructs the sender to discontinue sending electronic messages;

parsing, by the one or more processors of the computer system, the electronic messages to the unsubscribe link included in the least one electronic message;

creating, by the one or more processors of the computer system, a record associated with the identified unsubscribe link in a database;

acquiring, for the at least one electronic message, metadata including information about the at least one electronic message and information about the identified unsubscribe link;

providing, by the computer system, the metadata with the identified unsubscribe link in the record in the database;

generating, by the one or more processors of the computer system, a table for display at a computer including the identified unsubscribe link based on the record in the database, the table further including a sender email address of the metadata for the identified unsubscribe link; and transmitting the table including the identified unsubscribe links to the computer.

16. The computer program product of claim 15, wherein the method further comprises:

formatting the arrangement of the plurality of records for display by an electronic device of an intended recipient; and configuring the database to provide the formatted arrangement of the records including of the identified unsubscribe link and the metadata at a predetermined time.

17. The computer program product of claim 15, wherein the method further comprises:

performing a security check operation on the identified unsubscribe link;

determining, in response to the security check operation, a security threat by the identified unsubscribe link; and modifying the identified unsubscribe link to protect the computer against the security threat.

18. The computer program product of claim 15, wherein the unsubscribe link of the each of the plurality of electronic messages has a uniform resource indicator (URI), and wherein performing the security check operation on the identified unsubscribe links comprises:

performing a reputation filtering operation on the identified unsubscribe links by performing a comparison of the URI and a list of URIs known to be associated with downloading security threat software; and adding a data result including a status of the comparison to the table.

\* \* \* \* \*